United States Patent [19]
Zollinger et al.

[11] Patent Number: 5,819,863
[45] Date of Patent: Oct. 13, 1998

[54] VEHICLE FOR CARRYING AN OBJECT OF INTEREST

[75] Inventors: W. Thor Zollinger, Idaho Falls, Id.; Todd A. Ferrante, Westerville, Ohio

[73] Assignee: Lockheed Martin Idaho Technologies Company, Idaho Falls, Id.

[21] Appl. No.: 705,495

[22] Filed: Aug. 28, 1996

[51] Int. Cl.$^6$ .................................................. B62D 11/00
[52] U.S. Cl. .................... 180/6.5; 180/901; 73/866.5; 901/1
[58] Field of Search .................................. 180/6.2, 6.48, 180/6.5, 313, 901; 73/866.5; 901/1

[56] References Cited

U.S. PATENT DOCUMENTS

| | | | |
|---|---|---|---|
| 5,363,935 | 11/1994 | Schempf et al. | 180/901 X |
| 5,435,405 | 7/1995 | Schempf et al. | 180/901 X |
| 5,473,953 | 12/1995 | Appel | 73/866.5 |
| 5,623,107 | 4/1997 | Patterson, Sr. et al. | 73/866.5 |

*Primary Examiner*—Kevin Hurley
*Attorney, Agent, or Firm*—Wells St John Roberts Gregory & Matkin

[57] ABSTRACT

A vehicle for carrying an object of interest across a supporting surface including a frame having opposite first and second ends; a first pair of wheels fixedly mounted on the first end of the frame; a second pair of wheels pivotally mounted on the second end of the frame; and a pair of motors borne by the frame, each motor disposed in driving relation relative to one of the pairs of wheels, the motors propelling the vehicle across the supporting surface.

11 Claims, 7 Drawing Sheets

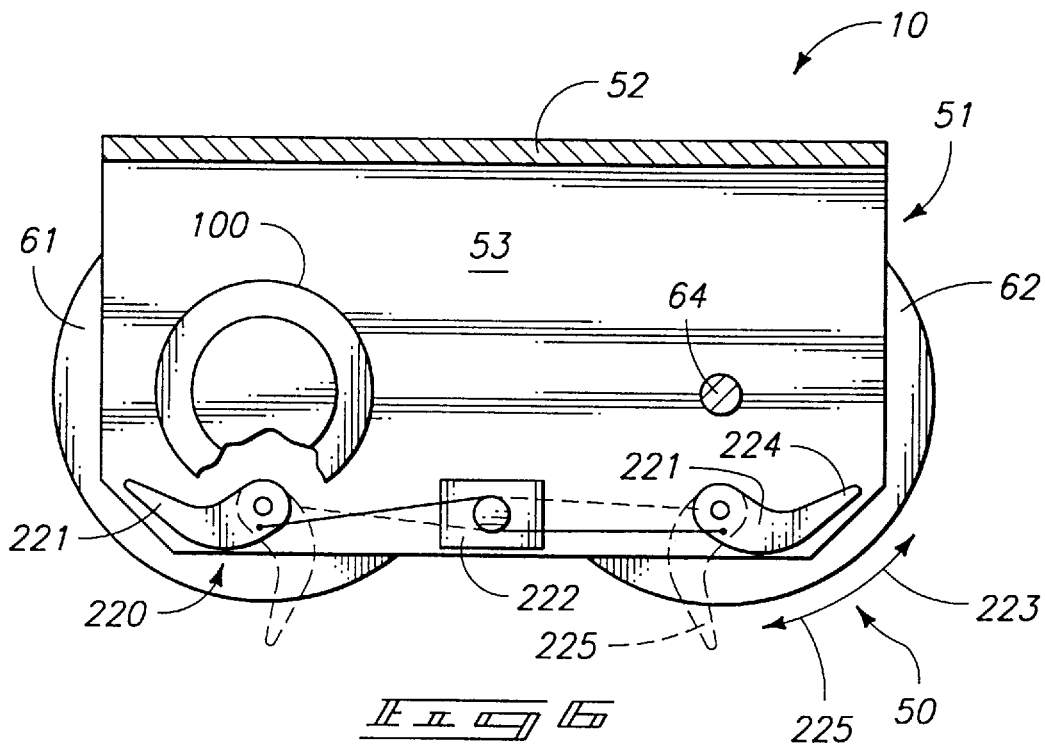
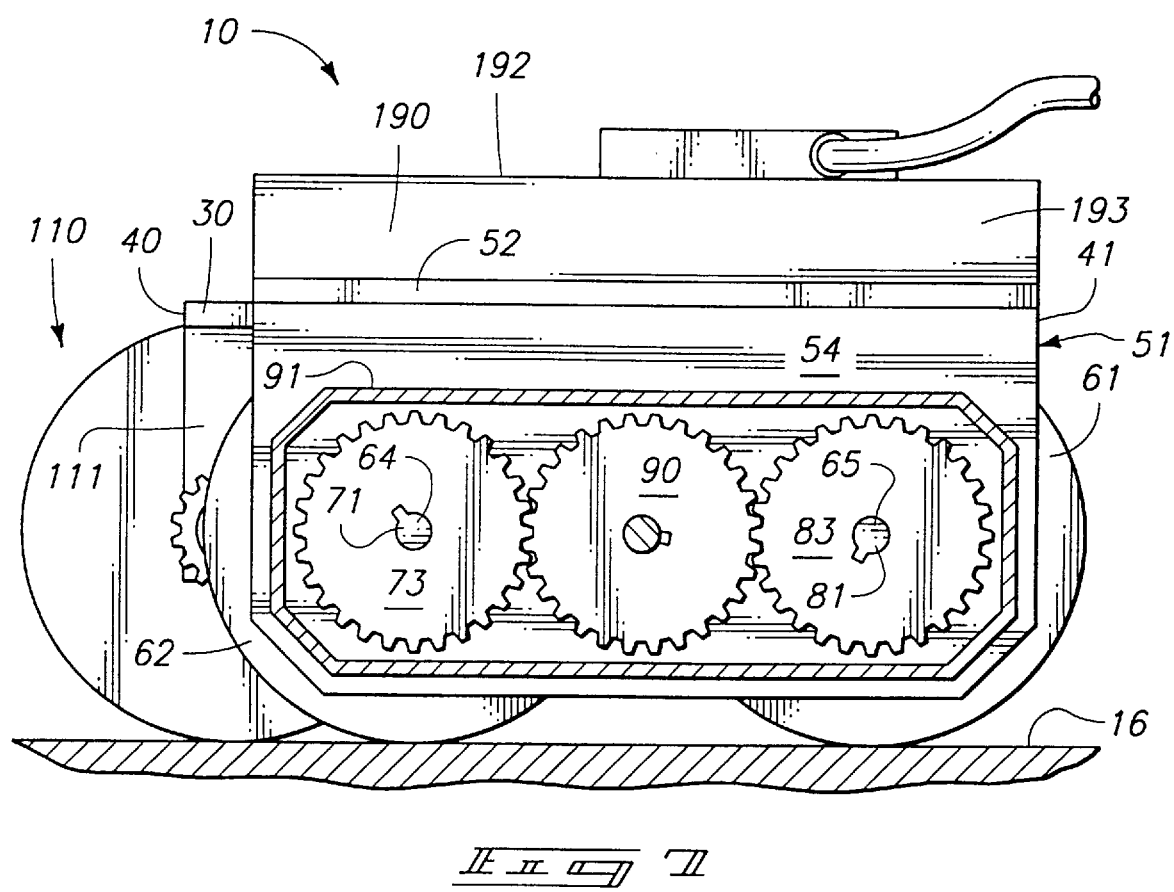

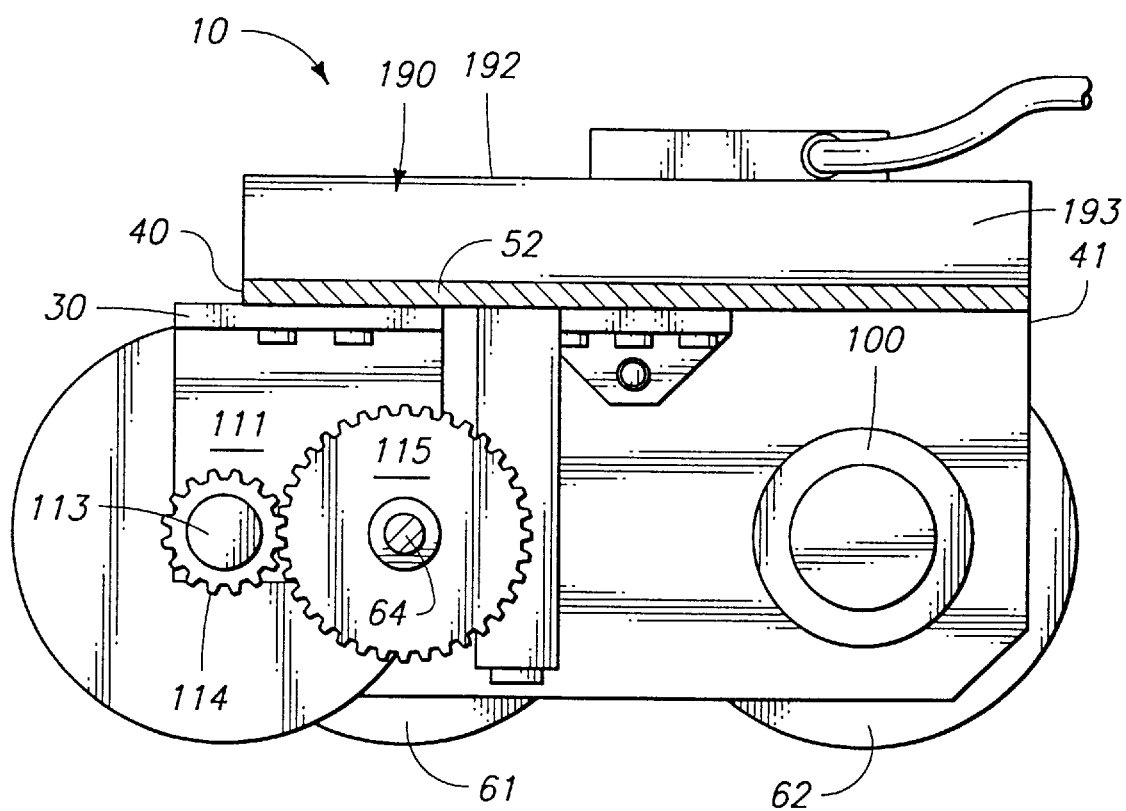

VEHICLE FOR CARRYING AN OBJECT OF INTEREST

CONTRACTUAL ORIGIN OF THE INVENTION

The United States Government has rights in this invention pursuant to Contract No. DE-AC07-94ID13223 between Lockheed Idaho Technologies Company and The United States Department of Energy.

BACKGROUND OF THE INVENTION

1. Field of the Invention

The present invention relates to a vehicle for carrying an object of interest across a supporting surface, and more specifically, to a vehicle which is operable to carry a sensor which can inspect a container enclosing a volatile fluid, the vehicle being submerged in the volatile fluid.

2. Background of the Prior Art

The problems associated with inspecting pipelines, tanks, vessels and surfaces of various containers which enclose all manner of volatile and nonvolatile fluids are well known. The problems and prior art practices for inspecting such vessels are detailed in U.S. Pat. No. 5,473,953, the teachings of which are incorporated by reference herein.

In the inspection of containers or tanks which are used to store caustic or other explosive chemicals, the current practices call, if possible, for the inspection of the exterior surfaces of the tanks in question because current inspection devices utilized for such inspections are not capable of operating in a submerged environment. Consequently, to inspect buried chemical and petroleum storage tanks, for example, these same tanks are first drained, cleaned and ventilated and then, a visual inspection of each tank is conducted by inspection personnel.

As should be understood, the current method of inspecting tanks such as those which enclose petroleum or other caustic chemicals, especially large tanks, can range from $100,000 to $250,000 depending upon the size of the tank. Further, the tank is rendered unserviceable for a month or more as the tank is drained, ventilated and thereafter inspected.

Therefore, it has long been known that it would be useful to provide a means whereby tanks which store caustic or other explosive chemicals or other agents may be inspected by a device which may be submerged in the fluid or other agent, the device providing a convenient means whereby the tank or other container can be inspected for conditions which could potentially impair the integrity of the container.

OBJECTS AND SUMMARY OF THE INVENTION

Therefore, one aspect of the present invention is to provide a vehicle for carrying an object of interest across a supporting surface.

Another aspect of the present invention is to provide a vehicle for carrying an object of interest, such as a sensor, which can gather information regarding the supporting surface over which the vehicle is traveling.

Another aspect of the present invention is to provide a vehicle which supports a rotary brush, the rotary brush disposed in engagement with the supporting service and operable to remove debris immediately in front of the vehicle.

Another aspect of the present invention is to provide a vehicle having wheels which rollably engage a supporting surface, and wherein the supporting surface comprises a ferromagnetic material, and wherein the wheels are magnetic.

Another aspect of the present invention is to provide a vehicle having a pair of motors which are disposed in driving engagement relative to the wheels, the respective motors controlling the direction of movement of the vehicle across the supporting surface.

Another aspect of the present invention is to provide a vehicle which can be submerged in a fluid and travel along a supporting surface, and wherein the vehicle includes a means for increasing the buoyancy of the vehicle while it is submerged in the fluid.

Another aspect of the present invention is to provide a vehicle which is supported for rolling engagement across a ferromagnetic supporting surface by a pair of magnetic wheels, and wherein the vehicle includes means for releaseably detaching the magnetic wheels from the underlying ferromagnetic supporting surface.

Still another aspect of the present invention is to provide a vehicle for inspecting an underlying supporting surface, and wherein the vehicle achieves the benefits to be derived from related prior art devices while avoiding the detriments individually associated therewith.

Yet another aspect of the present invention is to provide a vehicle which operates in combination with various subassemblies such as lights, cameras, retrieving devices and sensors of all types, the vehicle carrying these various subassemblies in harsh environments.

Another aspect of the present invention is to provide a vehicle which is rendered easily accessible for maintenance, modification or the like.

Further objects and advantages are to provide improved elements and arrangements thereof in a vehicle for the purposes described, and which is dependable, economical, durable and fully effective in accomplishing its intended purposes.

These and other objects and advantages are achieved in a vehicle for carrying an object of interest across a supporting surface, comprising a frame having opposite first and second ends; a first pair of wheels fixedly mounted on the first end of the frame; a second pair of wheels pivotally mounted on the second end of the frame; and a pair of motors borne by the frame, each motor disposed in driving relation relative to one of the pairs of wheels, the motors propelling the vehicle across the supporting surface.

BRIEF DESCRIPTION OF THE DRAWINGS

FIG. 6 is a partial, transverse, vertical sectional view taken from a position along line 6—6 of FIG. 4.

FIG. 7 is a partial, transverse, vertical sectional view taken from a position along line 7—7 of FIG. 4.

FIG. 8 is a partial, transverse, vertical sectional view taken from a position along line 8—8 of FIG. 4.

DETAILED DESCRIPTION OF THE PREFERRED EMBODIMENTS

This disclosure of the invention is submitted in furtherance of the constitutional purposes of the U.S. Pat. Laws "to promote the progress of science and useful arts" (Article 1, Section 8).

Figure 1:
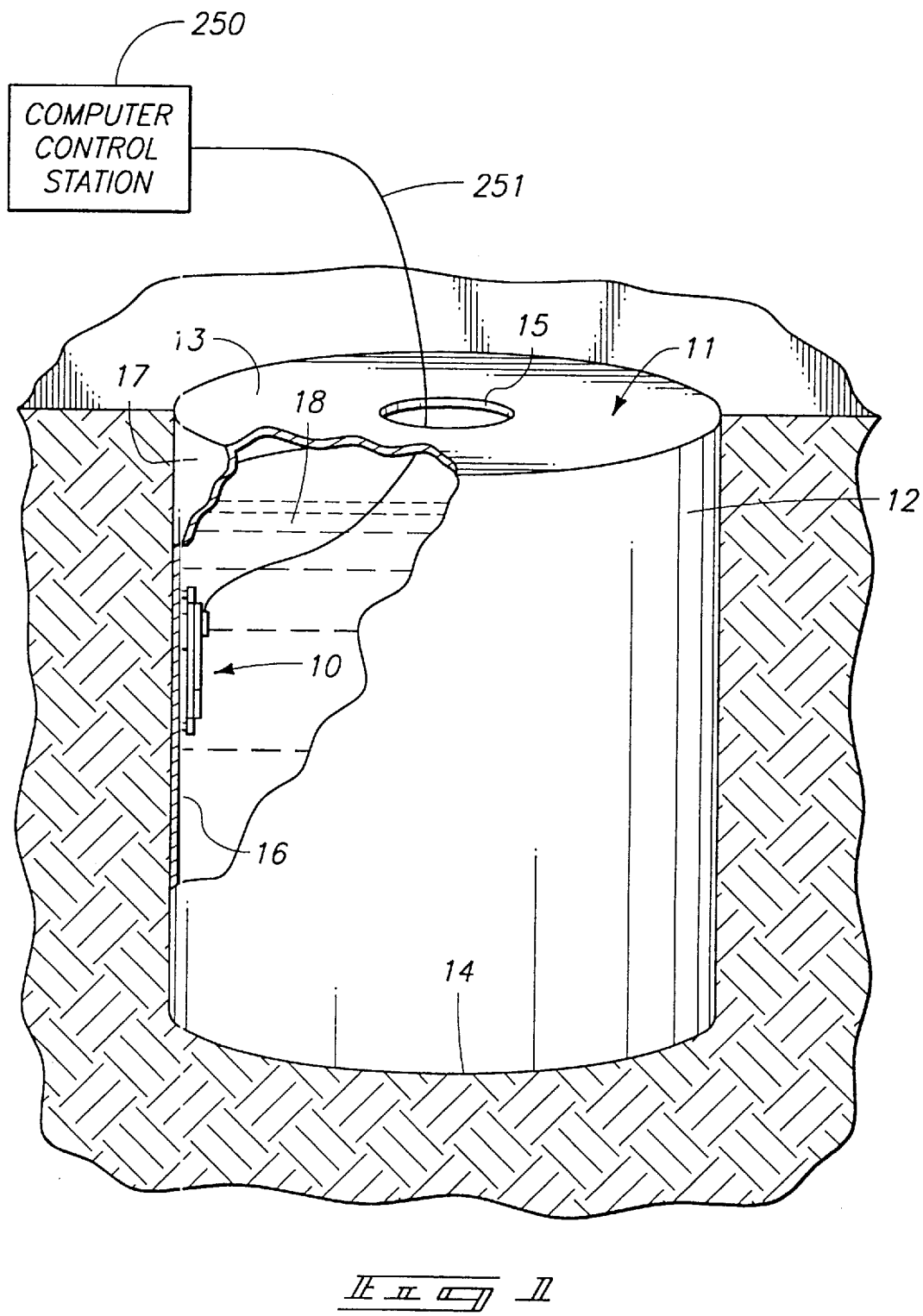
FIG. 1 is a greatly simplified, environmental view of the subject invention shown in a typical operative configuration where it is illustrated as traveling over the inside surface of a storage tank.
Figure 2:
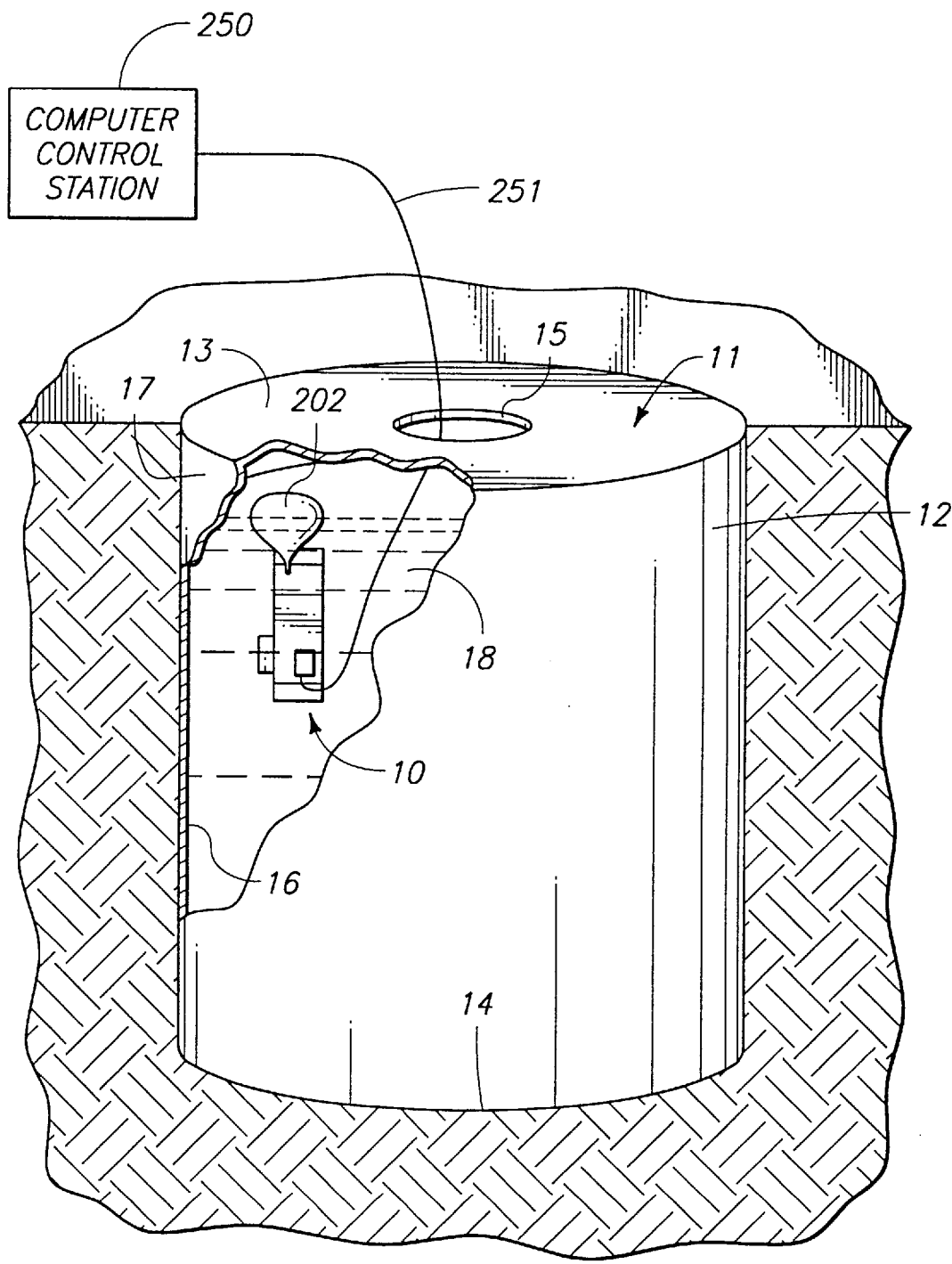
FIG. 2 is a greatly simplified, environmental view of the subject invention shown in a second operative configuration where it is buoyantly supported in the fluid which is enclosed within the storage tank.
Figure 3:
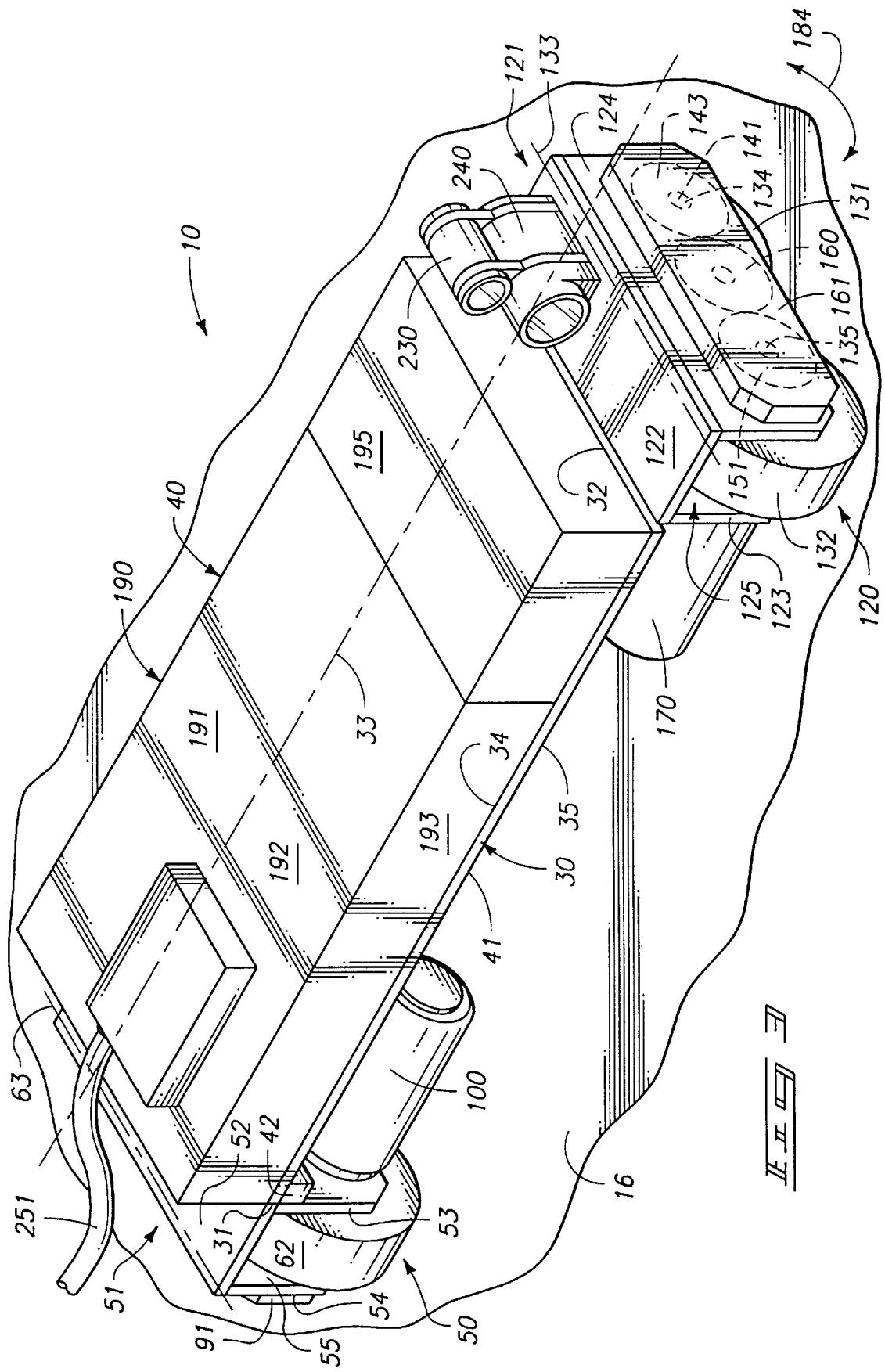
FIG. 3 is a rear perspective view of the subject invention.

Referring more particularly to the drawings, the vehicle for carrying an object of interest is generally indicated by the numeral 10 in FIGS. 1, and 3 respectively. As illustrated in FIGS. 1 and 2, the vehicle 10 is shown in an operational environment where it is positioned within a storage vessel, or tank 11. The storage vessel or tank 11 is defined by a substantially continuous sidewall 12. A top and bottom surface, 13 and 14 are sealably affixed to the continuous sidewall 12. An opening 15, of given dimensions, is formed in the top portion 13 and provides access to the interior of the storage vessel 11. Still further, the continuous sidewall 12 has an interior facing surface 16, and an exterior facing surface 17. A fluid 18 is stored, confined, or otherwise enclosed within the tank 11. The fluid may be of any nature including both volatile and nonvolatile materials, and gaseous, liquid, and gaseous and liquid combinations. For purposes of the present specification, the invention will be described hereinafter, as it would be configured if it was submerged within a volatile fluid 18. Such fluids might include hydrocarbon based products such as gasoline, various grades of oil, and the like. The continuous sidewall 12, and more particularly, the interior facing surface 16 thereof, comprises a ferromagnetic supporting surface upon which the vehicle 10 travels.

Figure 4:
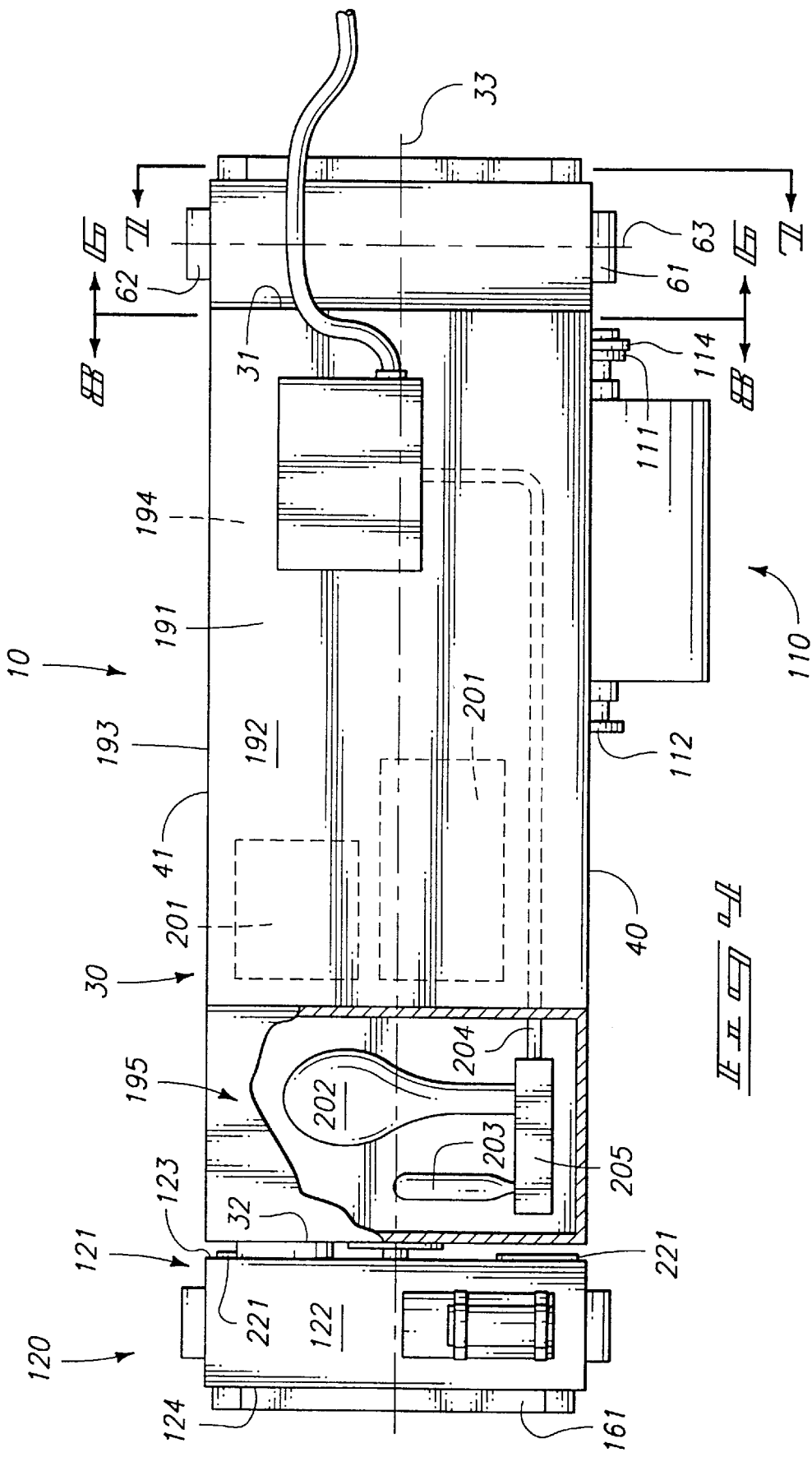
FIG. 4 is a top plan view of the subject invention shown in a typical operative configuration and wherein some underlying surfaces are removed to show the structure thereunder.

As best seen by reference to FIGS. 3, and 4 the vehicle 10 of the subject invention includes a frame generally indicated by the numeral 30. The frame has a first end 31, and an opposite, second end 32. Still further, the frame has a longitudinal line of reference 33, an upwardly facing or top surface 34, and a lower or bottom facing surface 35. The frame has a forward facing edge 40, and an opposite, rearward facing edge 41. As best seen in FIG. 3, a mounting block 42 is affixed on the bottom surface 35 by a plurality of fasteners, not shown, and which threadably extend through the frame 30, at the first end thereof 31. The frame 30 may be fabricated from a number of different materials. However, lightweight, high strength composites which are not chemically reactive in the fluid 18, are preferred.

Figure 5:
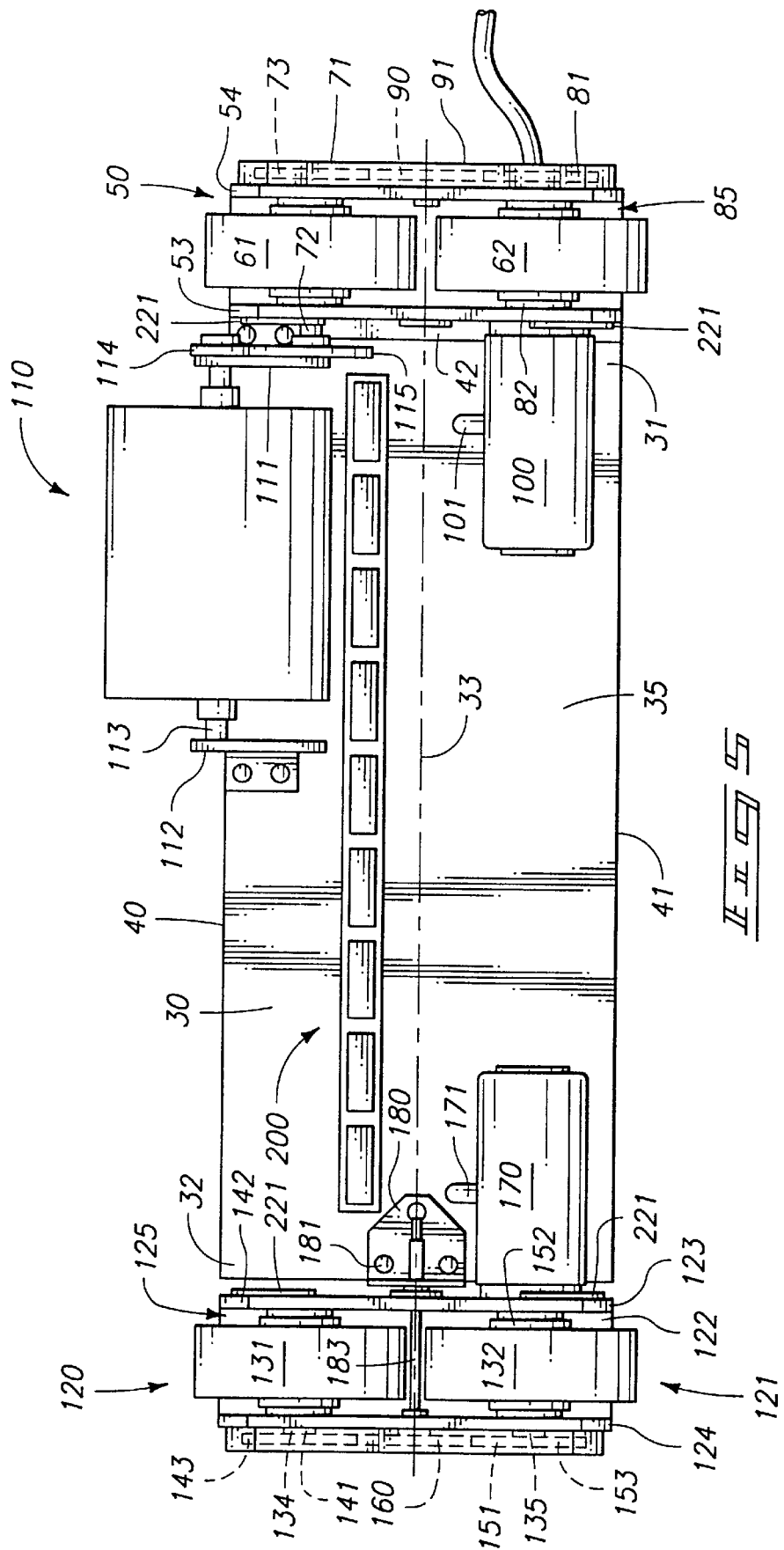
FIGS. 5 is a bottom plan view of the subject invention.

A first pair of wheels 50 are mounted on the first end 31 of the frame 30 by means of fasteners, not shown, and which are received through the mounting block 42. The first pair of wheels 50 are enclosed for rotational movement within a first housing or truck 51. The first pair of wheels 50 are fabricated from a suitable magnetic material. The wheels 50, therefore, are magneticly attracted to the underlying ferromagnetic supporting surface 16 once they are placed in rolling engagement therewith. The first housing 51 has a top surface 52, which is disposed in substantially coplanar relation relative to the top surface 34 of the frame 30, and further includes first and second sidewalls 53 and 54 which depend downwardly from the top surface. The sidewalls 53 and 54 are disposed in predetermined, substantially parallel spaced relation thereby defining a cavity 55 therebetween. The first pair of wheels 50 includes a first wheel 61, and a second wheel 62 which are mounted for rotational movement in substantially identical planes. These identical planes of rotation are generally indicated by the numeral 63. A first axle 64 (FIG. 7) mounts the first wheel 61 for rotational movement between the first and second sidewalls 53 and 54. Similarly, a second axle 65 mounts the second wheel 62 for rotational movement between the first and second sidewalls 53 and 54, and in spaced relation relative to the first wheel. As best seen in FIG. 5, the first axle 64 has a first end 71, and an opposite second 72 which are disposed laterally outwardly relative to first and second sidewalls, respectively. As best appreciated by a study of FIG. 7, a driven gear 73 is fixedly mounted on the first end 71. Further, the second axle 65 has a first end 81, and opposite second end 82. A driving gear 83 is mounted on the first end 81 thereof. Still further, an idler gear 90 is disposed in meshing relation therebetween the driven gear 73, and the driving gear 83. The idler gear is supported for rotational movement on the first housing 51. As seen in FIG. 5, mounted on the bottom surface 35 of the frame 30, and positioned near the rearward facing edge 41, is a first motor 100. The first motor 100 is disposed in driving relation relative to the second end 82 of the second axle 65. An electrical conduit 101 is electrically coupled in signal transmitting relation relative to the first motor 100. The operation of the first motor will be discussed in greater detail hereinafter.

As best seen in FIGS. 5 and 7, mounted on the forward facing edge 40 of the frame 30 is a rotary brush which is generally indicated by the numeral 110. The rotary brush is secured on the frame 30 by means of first and second support members 111 and 112, respectively. The brush is disposed in contact with the underlying supporting surface 16 of the tank 11. An axle 113 is rotatably mounted between the first and second support members and is secured on the brush. As best seen in FIG. 8, mounted on one end of the axle 113 is a driven gear 114 of conventional design. Further, a driving gear 115 is mounted on the second end 72 of the first axle 64. As will be recognized, rotation imparted to the first and second wheels 61, and 62 by the first motor 100 and by means of power transmission through the respective gears 73, 83 and 90 causes the rotary brush 110 to rotate in a given direction whereby it moves debris and other material in a direction away from the forward facing edge of the frame 30. The significance of this feature will be discussed in greater detail hereinafter.

As best seen in FIGS. 3 and 5, a second pair of wheels 120 are pivotally mounted on the second end 32 of the frame 30. The second pair of wheels 120 are fabricated from magnetic material similar to that which is used with the first pair of wheels 50. The second pair of wheels 120 are enclosed within a second housing or truck 121. The truck 121 has a top surface 122 which is disposed in substantially coplanar relation relative to the top surface 34 of the frame 30. Further, the second housing 121 has first and second sidewalls 123 and 124, respectively, which depend downwardly from the top surface, and which define a cavity 125 therebetween. The second housing 121 rotatably mounts first and second wheels 131 and 132, respectively, in predetermined, substantially coplanar, spaced relation, one to the other. As will be recognized, the plane of rotation 133 of the individual wheels 131 and 132 is substantially parallel to the plane of rotation 63, for the first pair of wheels 50. Further, it will be recognized that the individual planes of rotation 63 and 133 are substantially perpendicular to the longitudinal line of reference 33 and parallel to the forward direction of travel of the vehicle 10. As was discussed earlier with respect to the first pair of wheels 50, the second pair of wheels 120 similarly includes first and second axles 134 and 135, respectively. The first axle 134 has opposite first and second ends 141 and 142, respectively. In a construction which is a mirror image of that shown in FIG. 7, the second housing 121 includes a driven gear 143 (FIG. 3), which is mounted on the first end 141 of the first axle; and a second axle 135 which has first and second ends 151 and 152, respectively. A driving gear 153 is mounted endwardly on the first end 151 of the second axle. Further an idler gear 160 is mounted for rotational movement on the first sidewall 123. The idler gear is disposed in meshing relation relative to the driving and driven gears 153 and 143, respectively. As will be seen in FIG. 5, a second motor 170, of substantially identical design to the first motor 100, is disposed in driving relation relative to the second end 152 of the second axle. The motor 170 is affixed to the bottom surface 35 of the frame 30. An electrical conduit 171 is electrically coupled in signal transmitting relation relative to the second motor. As should be understood, the selective energizing of the individual first and second motors 100, and 170 will result in movement of the vehicle 10, in a given direction, across the supporting surface 16.

As best seen in FIGS. 3 and 5, the second pair of wheels 120 are pivotally mounted on the second end 32, of the frame 30, by means of a mounting fixture 180. This mechanical arrangement of the wheels 120 allows the vehicle 10 to move over obstructions on the supporting surface 16, such as welding seams, and the like, without loosing contact with the underlying supporting surface 16. The mounting fixture is secured on the bottom surface 35 of the frame 30. The mounting fixture 180 is secured in place substantially along the longitudinal line of reference 33 by means of conventional screw threadable fasteners 181. The mounting fixture 180 includes a truck pivot axle 183 which extends longitudinally outwardly relative thereto. The truck pivot axle 183 is received between the individual pairs of wheels through apertures formed in the respective first and second sidewalls 123 and 124 of the second wheel housing 121. The second pair of wheels 120 are thereby rendered operable for pivotal movement along an arcuately shaped path of travel which is generally indicated by the line label 184.

As best seen by reference to FIGS. 3 and 4, a first enclosure or housing 190 is borne by the frame 30. In particular, the housing 190 is fixed on the top surface 34 thereof. The first enclosure is substantially fluid impervious, and further is defined by a first portion 191. The first portion has a top surface 192, and a substantially continuous sidewall 193. The top surface 192 and continuous sidewall 193 define a cavity 194 of given dimensions. The housing 190 encloses various subcomponents and other electrical devices which are used in combination with the vehicle 10. The enclosure 190 further has a second portion 195, which also is fluid impervious, and which is mounted adjacent the first portion 191. The housing 190 may be pressurized with an inert gas, or otherwise filled with any number of fluids in a fashion which renders the vehicle explosion resistant. If an inert gas is employed to fill the cavity, the gas is operable to increase the buoyancy of the vehicle 10 in the fluid 18. This increase in buoyancy would operate in a fashion to further enhance the payload capability of the vehicle 10.

As best illustrated by reference to FIG. 5, a sensor array 200 is borne by the bottom surface 35, and is oriented in a predetermined position to detect abnormalities in the underlying interior facing surface 16 of the sidewall 12. The individual sensors may be disposed in a predetermined pattern across the length of the vehicle 10, or in the alternative, may be positioned just immediately rearwardly of the rotary brush 110. As was earlier disclosed, the rotary brush 110 is operable, upon movement of the vehicle 10, to remove loose material from immediately in front of the vehicle 10. Such sensors might include, for example, ultrasonic sensors which would be utilized to determine the thickness of the underlying supporting surface 16, or multiple sensors which could be employed to determine various characteristics of the underlying supporting surface 16. As best seen in FIG. 4, a sensor assembly 201 is borne by the frame 35 and is disposed in the enclosure or housing 190. The sensor assembly will preferably include pressure sensors which are used to insure that the enclosure cavity 194 is pressurized above the external pressure provided by the fluid 18 so that any leakage from the housing 190 will be outwardly therefrom. Further, the sensor assembly may also include temperature sensors which will monitor the temperature of the cavity 194 to insure that the enclosure's external temperature does not exceed safe minimums during operation in the fluid 18. These devices will be coupled in signal transmitting relation relative to the power supply provided to the vehicle 10. The power supply (not shown) is coupled with the computer control station illustrated in FIG. 1. In the event of a low pressure or a high temperature alarm, the sensor assembly is effective to shut off power to the vehicle 10 thereby eliminating any explosion hazard. The sensor assembly 201 may be further operable to control other features or facets of operation of the vehicle 10 such as provide meaningful information regarding the precise location of the vehicle relative to the tank 11. This would facilitate the accurate control of the vehicle 10 from an exterior location. The operation of the vehicle 10 will be discussed in greater detail, hereinafter.

As best seen in FIGS. 2 and 4, the vehicle 10 includes a retrieval balloon 202 which is enclosed within the second portion 195 of the housing 190. In this regard, the retrieval balloon is stowed in a packaged state within the second portion 195 of the housing 190. The second portion of the housing further includes a pressurized gas container 203 which is connected by means of a gas conduit 204 to the retrieval balloon 202, and other elements of the present vehicle which will be discussed, hereinafter. An actuation assembly 205 controls fluid flow through the gas conduit 204 to the retrieval balloon 202 and other assemblies.

In the event that the vehicle 10 needs to be quickly recovered from the tank 11 for reasons of malfunction, or other hazard, a release assembly 220 is provided to detach the magnetic wheels 50, and 120 from the underlying ferromagnetic supporting surface 16. As seen in FIG. 6, the release assembly 220 includes four vehicle release members which are generally indicated by the numeral 221. Each release member 221 is associated with one of the wheels 10 of the vehicle and therefore for purposes of simplicity, only a pair of release assemblies are described and shown, it being understood that the release assemblies on the opposite side of the vehicle are substantially mirror images of same. As illustrated in FIG. 6, the vehicle release members 221 have individual extendable legs 221 which are movably connected to an activation assembly 222. The activation assembly, in turn, is connected in fluid flowing relation to the pressurized gas container 203. As should be understood, the activation assembly is operable to pull the individual legs downwardly, and into contact with the supporting surface 16. In particular, the individual leg members move along a path of travel 223 between a first, or up position 224, and a second, or release position 225. In the second, or release position, the individual legs are operable to move the vehicle wheels 50, and 120 a given distance away from the supporting surface 16 of the tank 11, thereby breaking the magnetic attraction of the respective wheels 50, and 120 for the inside facing surface 16. When this condition is achieved, the vehicle 10 is released from the surface 16. Simultaneously with the actuation of the release assembly 220, the retrieval balloon 202 is deployed. This deployment is achieved when it is simultaneously supplied with gas under pressure from the pressurized gas container 203. When this event occurs, the second portion 195 of the housing 190 is disengaged from the vehicle 10 by the balloon thereby allowing the balloon to inflate. As best seen in FIG. 2, the balloon is shown in a fully deployed position supporting the vehicle 10 for retrieval from the surface of the fluid 118.

The vehicle 10 also includes additional assemblies which facilitate the use of the vehicle in a submerged environment. In particular, the present vehicle 10 includes a head lamp 230 which is borne by the second pair of wheels 120 and which provides a convenient means of illuminating the supporting surface 16 immediately forward of the vehicle 10. Still further, a camera 240 is mounted adjacent to the lamp and is operable to provide a video signal which can be studied from a remote location. As best seen in FIGS. 1 and 2, a computer control station is connected by means of an electrical conduit 251 to the vehicle 10. The computer control assembly provides electrical power, by means of electrical conduits 251, 101, and 171 to energize the respective motors 100 and 170; receives data from the sensor array 200, and other sensor information internally of the housing 190; and further controls the precise direction of movement of the vehicle 10 internally of the tank 11 by means of the selective energizing of the respective motors 100, and 170. Further, the computer control system includes a means for tracking the movement of the vehicle 10 across the supporting surface 16.

Operation

The operation of the described embodiment of the present invention is believed to be readily apparent and is briefly summarized at this point.

As best seen by reference to FIGS. 3 and 4, the present invention relates to a vehicle 10 for carrying an object of interest, such as a sensor array 200, across a supporting surface 16. The vehicle 10 includes a frame 30 having opposite first and second ends 31, and 32; a first pair of wheels 50 fixedly mounted on the first end of the frame; a second pair of wheels 120 pivotally mounted on the second end of the frame; and a pair of motors 100, and 170 borne by the frame, each motor disposed in driving relation relative to one of the pairs of wheels, the motors propelling the vehicle across the supporting surface. As should be understood the pivotal, second set of wheels 120 ensures that the vehicle 10 can move across obstructions such as welded seams, or the like which may be encountered on the supporting surface 16.

More specifically, the present invention relates to a vehicle 10 for carrying an object of interest across the supporting surface 16 and which includes a frame 30 having opposite first and second ends 31, and 32 and a line of reference 33; a first pair of wheels 50 fixedly mounted on the first end of the frame, the individual wheels 61 and 62 of the first pair of rotatable wheels located in a first given coplanar orientation one to the other, the first coplanar orientation positioned substantially transversely relative to the line of reference; a second pair of wheels 120 pivotally mounted on the second end of the frame, the individual wheels 131, and 132 of the second pair of rotatable wheels located in a second given coplanar orientation 133 one to the other, the second coplanar orientation disposed in substantially parallel spaced relation to the first coplanar orientation; a pair of motors 100, and 170 borne by the frame 30 each motor disposed in driving relation relative to one of the pairs of wheels 50 and 120, the motors propelling the vehicle 10 across the supporting surface 16; means for selectively energizing the respective motors 250, the selective energizing of the respective motors controlling the direction of movement of the vehicle across the supporting surface; a sensor 200 borne by the frame 30 and effective to gather information regarding the supporting surface 16 over which the vehicle 10 is traveling; and a rotary brush 110 borne by the frame 30 and disposed in engagement with the supporting surface 16.

Therefore, it will be seen that the vehicle 10 of the present invention provides a convenient means whereby storage tanks 11 of various designs may be conveniently inspected from a remote location without requiring the tank to be emptied or otherwise purged of its contents, the present device providing a safe and reliable means by which such inspections can be achieved with nominal effort and minimum cost.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

We claim:

1. A vehicle for carrying an object of interest across a supporting surface of a container which encloses a given liquid, comprising:

a frame having opposite first and second ends;

a first pair of wheels fixedly mounted on the first end of the frame;

a second pair of wheels pivotally mounted on the second end of the frame;

a pair of motors borne by the frame, each motor disposed in driving relationship relative to one of the pairs of wheels, the motors propelling the vehicle across the supporting surface; and a means borne by the frame for increasing the buoyancy of the vehicle in the given liquid.

2. A vehicle for carrying an object of interest across a supporting surface which is ferromagnetic, comprising:

a frame having opposite first and second ends;

a first pair of wheels fixedly mounted on the first end of the frame;

a second pair of wheels pivotally mounted on the second end of the frame, and wherein the first and second pair of wheels are magnetic;

means borne by the frame for detaching the first and second pair of wheels from the supporting surface; and a pair of motors borne by the frame, each motor disposed in driving relation relative to one of the pair of wheels, the motors propelling the vehicle across the supporting surface.

3. A vehicle for carrying an object of interest across a supporting surface which is ferromagnetic and which defines a container which encloses a given fluid, comprising:

a frame having opposite first and second ends;

a first pair of wheels fixedly mounted on the first end of the frame;

a second pair of wheels pivotally mounted on the second end of the frame, and wherein the first and second pairs of wheels are magnetic;

means borne by the frame for detaching the first and second pairs of wheels from the supporting surface;

means borne by the frame for partially buoyantly supporting the vehicle in the given fluid; and a pair of motors borne by the frame, each motor disposed in driving relation relative to one of the pairs of wheels, the motors propelling the wheels across the supporting surface.

4. A vehicle for carrying an object of interest across a supporting surface which defines a container and which encloses a given liquid, comprising:

a frame having opposite first and second ends and a line of reference;

a first pair of wheels fixedly mounted on the first end of the frame, the individual wheels of the first pair of rotatable wheels located in a first given coplanar orientation one to the other, the first coplanar orientation positioned substantially transverse relative to the line of reference;

a second pair of wheels pivotally mounted on the second end of the frame, the individual wheels of the second pair of rotatable wheels located in a second given coplanar orientation one to the other, the second coplanar orientation disposed in substantially parallel spaced relation to the first coplanar orientation;

a pair of motors borne by the frame, each motor disposed in driving relation relative to one of the pairs of wheels, the motors propelling the vehicle across the supporting surface;

means borne by the frame for increasing the buoyancy of the vehicle in the given fluid;

means for selectively energizing the respective motors, the selective energizing of the respective motors controlling the direction of movement of the vehicle across the supporting surface;

a sensor borne by the frame and effective to rather information regarding the supporting surface over which the vehicle is traveling; and a rotary brush borne by the frame and disposed in engagement with the supporting surface.

5. A vehicle for carrying an object of interest across a supporting surface which is ferromagnetic, comprising:

a frame having opposite first and second ends and a line of reference;

a first pair of wheels fixedly mounted on the first end of the frame, the individual wheels of the first pair of rotatable wheels located in a first given coplanar orientation one to the other, the first coplanar orientation positioned substantially transverse relative to the line of reference;

a second pair of wheels pivotally mounted on the second end of the frame, the individual wheels of the second pair of rotatable wheels located in a second given coplanar orientation one to the other, the second coplanar orientation disposed in substantially parallel spaced relation to the first coplanar orientation, and wherein the first and second pairs of wheels are magnetic;

a pair of motors borne by the frame, each motor disposed in driving relation relative to one of the pairs of wheels, the motors propelling the vehicle across the supporting surface;

means for selectively energizing the respective motors, the selective energizing of the respective motors controlling the direction of movement of the vehicle across the supporting surface;

means borne by the frame for moving a first and second pair of wheels away from the supporting surface;

a sensor borne by the frame and effective to gather information regarding the supporting surface over which the vehicle is traveling; and a rotary brush borne by the frame and disposed in engagement with the supporting surface.

6. A vehicle for carrying an object of interest across a supporting surface which is ferromagnetic and which defines a container which encloses a given fluid, comprising:

a frame having opposite first and second ends and a line of reference;

a first pair of wheels fixedly mounted on the first end of the frame, the individual wheels of the first pair of rotatable wheels located in a first given coplanar orientation one to the other, the first coplanar orientation positioned substantially transverse relative to the line of reference;

a second pair of wheels pivotally mounted on the second end of the frame, the individual wheels of the second pair of rotatable wheels located in a second given coplanar orientation one to the other, the second coplanar orientation disposed in substantially parallel spaced relation to the first coplanar orientation, and wherein the first and second pairs of wheels are magnetic;

a pair of motors borne by the frame, each motor disposed in driving relation relative to one of the pairs of wheels, the motors propelling the vehicle across the supporting surface;

means for selectively energizing the respective motors, the selective energizing of the respective motors controlling the direction of movement of the vehicle across the supporting surface;

means borne by the frame for moving the first and second pairs of wheels away from the supporting surface;

a sensor borne by the frame and effective to gather information regarding the supporting surface over which the vehicle is traveling;

means borne by the frame for partially buoyantly supporting the vehicle in the given fluid; and a rotary brush borne by the frame and disposed in engagement with the supporting surface.

7. A vehicle for carrying an object of interest across a supporting surface, the vehicle being submerged in given fluid, comprising:

a frame having opposite ends;

a pair of wheels individually mounted on the opposite ends of the frame;

a pair of motors mounted on the frame, each motor disposed in driving relation to one of the pairs of wheels; and a means mounted on the frame for increasing the buoyancy of the vehicle in the fluid.

8. A vehicle for carrying an object of interest across a ferromagnetic supporting surface, comprising:

a frame having opposite ends;

a pair of magnetic wheels individually mounted on the opposite ends of the frame;

means mounted on the frame for detaching each pair of wheels from the ferromagnetic supporting surface; and a pair of motors mounted on the frame and independently disposed in driving relation relative to one of the pairs of wheels.

9. A vehicle for carrying an object of interest submerged in a fluid and across a ferromagnetic supporting surface, comprising:

a frame having opposite ends;

a pair of magnetic wheels individually mounted on the opposite ends of the frame;

means mounted on the frame for detaching each pair of wheels from the ferromagnetic supporting surface;

a pair of motors mounted on the frame and individually disposed in driving relation relative to each pair of wheels; and means mounted on the vehicle for partially buoyantly supporting the vehicle in a given fluid.

10. A vehicle for carrying an object of interest across a ferromagnetic supporting surface, comprising:

a frame having opposite ends;

a first pair of wheels mounted on one end of the frame, at least one wheel of said pair being magnetic;

a second pair of wheels mounted on the end of the frame opposite the first pair of wheels, at least one wheel of said pair of wheels being magnetic;

means mounted on the vehicle for detaching each of the magnetic wheels from the ferromagnetic supporting surface; and a pair of motors mounted on the frame and individually disposed in driving relation relative to the first and second pairs of wheels.

11. A vehicle for carrying an object of interest across a ferromagnetic supporting surface, comprising:

a frame having opposite ends;

a first pair of wheels mounted on one end of the frame a second pair of wheels mounted on the frame opposite to the first pair of wheels, and wherein at least one of the wheels of the second pair of wheels is magnetic;

means mounted on the frame for detaching the magnetic wheel from the ferromagnetic supporting surface; and a motor mounted on the frame disposed in driving relation relative to one of the pair of wheels.

* * * * *